(12) United States Patent
Robbins et al.

(10) Patent No.: US 6,293,572 B1
(45) Date of Patent: Sep. 25, 2001

(54) ISOLATED SUPPORT FOR A REAR SUSPENSION COMPONENT 1

(75) Inventors: Norman B. Robbins, Davison; Max A. Corporon, Rochester Hills, both of MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/468,392

(22) Filed: Dec. 20, 1999

Related U.S. Application Data

(63) Continuation-in-part of application No. 08/991,924, filed on Dec. 16, 1997.

(51) Int. Cl.[7] .................................................. B06G 11/52
(52) U.S. Cl. ........................ 280/124.155; 280/124.165; 280/124.177; 280/124.147; 267/220; 267/33
(58) Field of Search .................. 280/124.155, 124.1, 280/124.154, 124.146, 124.165, 124.164, 124.177, 124.179, 124.147; 267/220, 33, 292, 293, 259, 195

(56) References Cited

U.S. PATENT DOCUMENTS

| | | | |
|---|---|---|---|
| 4,274,655 | * 6/1981 | Lederman . | |
| 4,408,794 | 10/1983 | Harasaki | 296/198 |
| 4,721,325 | * 1/1988 | Mackovjak et al. | 267/33 X |
| 4,950,025 | 8/1990 | Yoshii | 296/195 |
| 5,133,573 | * 7/1992 | Kijima et al. | 267/220 X |
| 5,251,928 | * 10/1993 | Maeda . | |
| 5,308,048 | * 5/1994 | Weaver et al. | 267/293 X |
| 5,330,166 | * 7/1994 | Aoki | 267/220 |
| 5,350,214 | 9/1994 | Yamauchi et al. | 296/204 |
| 5,660,415 | 8/1997 | Redman et al. | 280/788 |
| 5,788,262 | * 8/1998 | Dazy et al. | 267/220 X |

* cited by examiner

Primary Examiner—J. J. Swann
Assistant Examiner—F. Zeender
(74) Attorney, Agent, or Firm—Mark P. Calcaterra

(57) ABSTRACT

A framing structure for support of the rear suspension components of an automotive which includes a pair of generally vertically oriented suspension strut towers spaced laterally with respect to the vehicle and with each strut tower fixedly attached at lower end portions to a lower cross beam and fixedly attached at upper end portions to an upper cross beam and having an isolating structure at the upper end portion of each strut tower to which the upper end portion of a rear suspension component such as a shock absorber or a MacPherson suspension strut is attached in a manner isolating the suspension component from the strut tower and upper cross beam.

3 Claims, 5 Drawing Sheets

ISOLATED SUPPORT FOR A REAR SUSPENSION COMPONENT 1

CROSS-REFERENCE TO RELATED APPLICATION

This application is a continuation-in-part of co-pending application Ser. No. 08/991,924, filed Dec. 16, 1997 entitled "Isolated Support for a Rear Suspension Component" by the same inventors as in the subject application.

BACKGROUND OF THE INVENTION

1. Field of the Invention

This invention concerns framing for a vehicle, and more particularly, to an improved rear frame structure for rear suspension components, primarily MacPherson type strut components which combine a shock absorber and a coil spring in a unitary assembly, the lower end portion of the strut component is operatively attached to a rear wheel support or spindle and the upper end of which is operably attached to the vehicle framing structure. The framing structure incorporates a pair of vertically oriented strut support towers spaced from one another laterally across the vehicle. A pair of laterally extending upper and lower cross beams extend between and are attached to the strut towers wherein a high degree of accuracy in tower spacing and alignment contributes to very accurate positioning thereof, particularly of the tower's upper end portions which are operably attached to the associated MacPherson suspension components. The subject arrangement provides an isolation structure between the suspension component's upper end portion and the framing structure for greatly reducing vibration and noise transmission during operation of the vehicle.

2. Description of Related Art

Prior to the present invention is was known to provide various reinforced rear framing structures and strut configurations have been designed to operatively mount the rear suspension components with the object of providing a comfortable ride and increased storage space within the vehicle body in the form of an enlarged luggage/cargo space.

For example, U.S. Pat. No. 4,408,794, for A Support Column for an Automotive Vehicle Wheel Suspension Assembly, issued Oct. 11, 1983, discloses a rear frame structure with support columns or suspension strut towers that are connected at an upper end by a thin-walled upper rear shelf panel and at a lower end by a substantially flat floor panel. With this construction, the suspension strut towers are designed to support rear wheel suspension components but are not readily adjustable relative to any supports for establishing a high degree of accuracy in spacing or parallelism.

In U.S. Pat. No. 5,350,214, for A Rear Body Structure for Automotive Vehicles, issued Sept. 27, 1994, opposing suspension strut towers are connected at their lower ends to special gusset constructions which are in turn connected to a floor cross member and are connected at their upper ends by gussets which are in turn connected to a panel-like rear shelve tray, thereby requiring additional means to stiffen the corners of a pass-through structure which reduces the opening size and the utility of the pass-through feature.

In U.S. Pat. No. 4,950,025, issued Aug. 21, 1990 for Automobile Rear Body Structures, a rear deck, fenders, inner panels and rear wheel houses are joined to form a compartment for receiving external forces such as from road shock imparted through the rear wheel suspension struts.

The framing arrangements disclosed in the previous prior patents provide various constructions and improvements to the vehicle body structures, they incorporate additional parts, assembly operations, and expense to achieve a sufficient degree of accuracy to provide a stable suspension strut platform for mounting suspension components. More particularly, the prior constructions do not provide the isolation of the suspension component from the strut tower and framing structure as in the subject embodiment. Resultantly, the suspension springs and shock absorbers cannot operate with high efficiency to dampen road caused vibrations while still isolating the vehicle body from feedback from the suspension components.

In addition to the previously discussed prior art, the following patents are disclosed to more completely disclose the state of the art. In U.S. Pat. No. 5,660,415, issued Aug. 26, 1997 for "A Torque Box Assembly for a Vehicle", a torque box for mounting a rear suspension trailing link is shown attached to a vehicle frame side rail and a body side rail for receiving external forces such as from road shock imparted through the rear wheel suspension.

In U.S. patent application Ser. No. 08/678,285, filed Jul. 11, 1996, entitled "Bracket With Floating Tap Plate for Connecting Vehicle Suspension to Body" a fastener for attaching a portion of a vehicle suspension to a vehicle body is disclosed.

SUMMARY OF THE INVENTION

The subject invention provides an improved suspension isolation arrangement for a vehicle's rear framing structure having a pair of suspension strut towers spaced laterally across the vehicle and with an upper cross beam and a lower cross beam affixed to the strut towers for providing great rigidity. The suspension strut towers each provide a suspension support for an upper end portion of a suspension component, particularly a MacPherson type strut which is a combined shock absorber and coil suspension spring. Resultantly, the improved arrangement isolates the vehicle framing from vibrations and periodic road induced forces imposed on the suspension components due to road irregularities as encountered by a vehicle wheel and tire.

The framing structure's upper cross beam comprises a unitary member extending laterally across the vehicle between the upper end portions of two suspension strut tower units which are spaced in the lateral direction of the vehicle. The upper end portion of each strut tower unit serves to operably support one end of a suspension component, the other end of which is attached to a rear wheel carrying structure. The upper cross beam has a closed construction when viewed in cross-section which imparts great rigidity thereto. The opposite end portions of the upper cross beam are operably attached to the upper portions of the suspension strut towers. In cooperation with the above described rigid platform, the subject invention provides an improved isolation structure carried by the strut tower and end portion of the cross beam for mounting an active end of the associated suspension component or MacPherson type strut. This isolation arrangement greatly inhibits transmission of road related vibrations to the vehicle framing from the suspension component.

The upper end portion of each strut tower defines a yoke-like configuration defined primarily by a pair of spaced side walls. An end portion of the cross beam is cradled in each yoke and extends between the spaced side walls of the strut tower. In assembly of the vehicle, the ends of the cross beam are nestled in or floated in the yoke portions which allows a sliding adjustment of the end of the beam between the spaced side walls. This sliding adjustment permits the upper portion of each strut tower to be adjusted laterally into a desired accurate alignment with the vehicle and with respect to the other strut tower for creating a truly parallel arrangement. Subsequently, the overlying side walls of each strut tower are attached to the adjacent end portion of the upper cross beam preferably by a plurality of widely spaced spot welds so that the framing structure is rigidly interconnected and the strut towers are accurately positioned to the desired location.

Another feature of this invention is to provide an improved "closed loop" framing structure for a vehicle that defines rigid supports for rear suspension components such as a shock absorber or a combination shock absorber and spring, i.e., a MacPherson strut. The upper end portion of the MacPherson strut is attached to a vibration isolating structure which inhibits transmission of road induced vibrations from the MacPherson strut to the vehicle framing. In addition to the upper cross beam, the framing structure also has a lower cross beam which is cooperative with the vehicle's floor to which it is welded and forms a substantially closed structure when viewed in cross-section. At each end of the lower cross beam, a side frame rail is attached to the lower cross beam and to the lower portion of the suspension strut towers. Each side rail also extends forward from the strut tower to establish a solid attachment base for a forward attachment of a longitudinal location link member of the rear suspension structure.

This invention's closed loop vehicle framing structure effectively counters bending moments imparted through the strut towers. The rigidity of the resultant structure permits the suspension components to more effectively operate in dissipating or converting energy imparted from road irregularities which tend to induce vibrations which otherwise would travel into the vehicle passenger compartment. More particularly, the closed loop support system of this invention completes an internal load path extending around the closed perimeter of the framing structure so that the suspension mounting points are sufficiently stiff wherein road induced vibrations are substantially dissipated by the suspension. Accordingly, this invention minimizes transmittal of vibration and noise into the interior compartments of the vehicle.

The above described framing and isolating attachment structure for mounting suspension components such as a MacPherson strut also permits the strut's coil spring and associated shock absorber to function with greater efficiency so as to substantially improve the level of vibrations and noise that are dissipated but also to decrease any degree of directly transmitted vibrations and noise from the MacPherson strut component to the vehicle framing so as not to adversely affect occupants or equipment in the associated vehicle.

This framing structure also readily adapts to the addition of a pass-through feature between the rear of the passenger compartment and the luggage/cargo space or trunk. Thus, a fold-down trunk access panel or the like can be incorporated so that elongated objects such as skis can be extended from the trunk into the passenger compartment and transported within the vehicle. Prior vehicle rear framing includes a relatively continuous body structure behind the rear seat back which inhibits addition of an effective pass-through structure. The previous trunk blocking structure is eliminated with the provision of the improved closed loop framing structure which even more importantly also provides increased structural rigidity that improves the support of the back of the rear seat of the vehicle as well as the suspension components.

More particularly, the closed loop framing structure of this invention provides a maximized rectangular pass-through opening through the rear seat back area that connects the passenger compartment with the trunk of the vehicle. The maximum width of the pass-through opening is generally limited by the space between the suspension strut towers. The pass-through opening is framed at the top by the upper cross beam including a generally U-shaped member and a shelf forming panel member which are welded together to provide the rigid closed structure as viewed in cross-section. Each end of this rigid upper cross beam is attached to a yoke portion carried at the upper end portion of a suspension strut tower. The pass-through opening is further defined at its lower edge by the floor panel which is welded to a generally W-shaped lower cross beam to form two rigid closed structures as viewed in cross-section. Each end of the lower beam is attached to a strut tower via a side rail member each of which extend fore and aft or longitudinally of the vehicle. A forward end of each side rail provides a base for pivotal attachment of a rear suspension longitudinal location link.

By attachment of accurately aligned strut towers to the upper and lower cross beams, a generally ring-shaped or closed loop framing structure is provided which is extremely rigid. This construction results in the two suspension strut towers to be very accurately positioned with respect to each other and with respect to the beam members. A framing structure is created that is sufficiently rigid to effectively support suspension components such as shock absorbers and springs. Resultantly, this improves the efficiency of the suspension springs and shock absorbers in dissipating road vibrations and any transmission of vibrations and noise into the interior compartments of the vehicle are greatly reduced by the strut isolation structure.

These and other features, objects and advantages of this invention will become more apparent from the following detailed description of an embodiment, reference hereby being made to drawings of the embodiment as follows:

DETAILED DESCRIPTION OF THE EMBODIMENT SHOWN IN THE DRAWINGS

Figure 1:
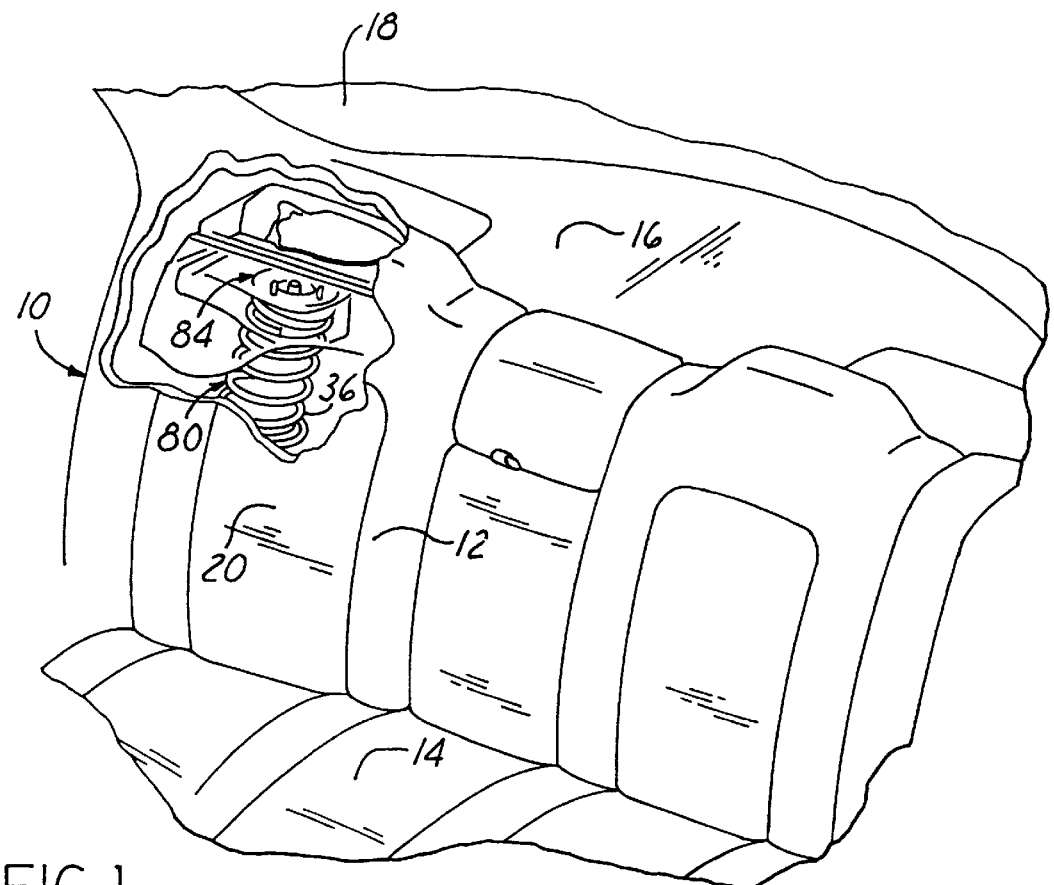
FIG. 1 is a pictorial view of the rear seat area of an automotive vehicle passenger compartment with parts broken away.
Figure 2:
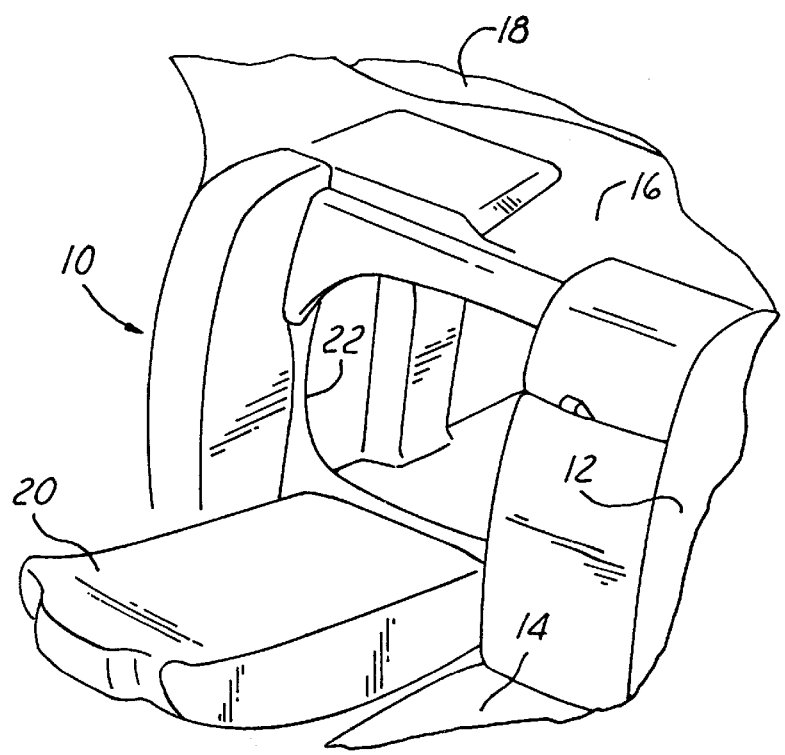
FIG. 2 is a pictorial view similar to FIG. 1 showing a pivotal fold-down seat portion in an opened position to provide pass-through access to the vehicle trunk.

Turning now in greater detail to the drawings, FIG. 1 shows a portion of the interior of an automotive vehicle and more particularly the rear seating area 10 having a seat assembly including a seat back 12 and seat cushion 14. Above and to the rear of the vehicle is a generally horizontal panel 16 at the base of a rear window or back light 18. As previously mentioned, the subject framing system allows for a pass-through feature from the passenger compartment to the trunk. In this regard, a portion 20 of the seat back is mounted for pivotal movement from a closed position shown in FIG. 1 to an opened position shown in FIG. 2. In the opened position, the pivotal portion 20 moves out of the way to uncover an access opening 22 which extends or opens into the trunk. The pivotal portion 20 can be selectively opened and folded down for communication between the vehicle trunk and the passenger compartment so that long objects such as skis, can be easily loaded and carried in the vehicle.

Figure 3:
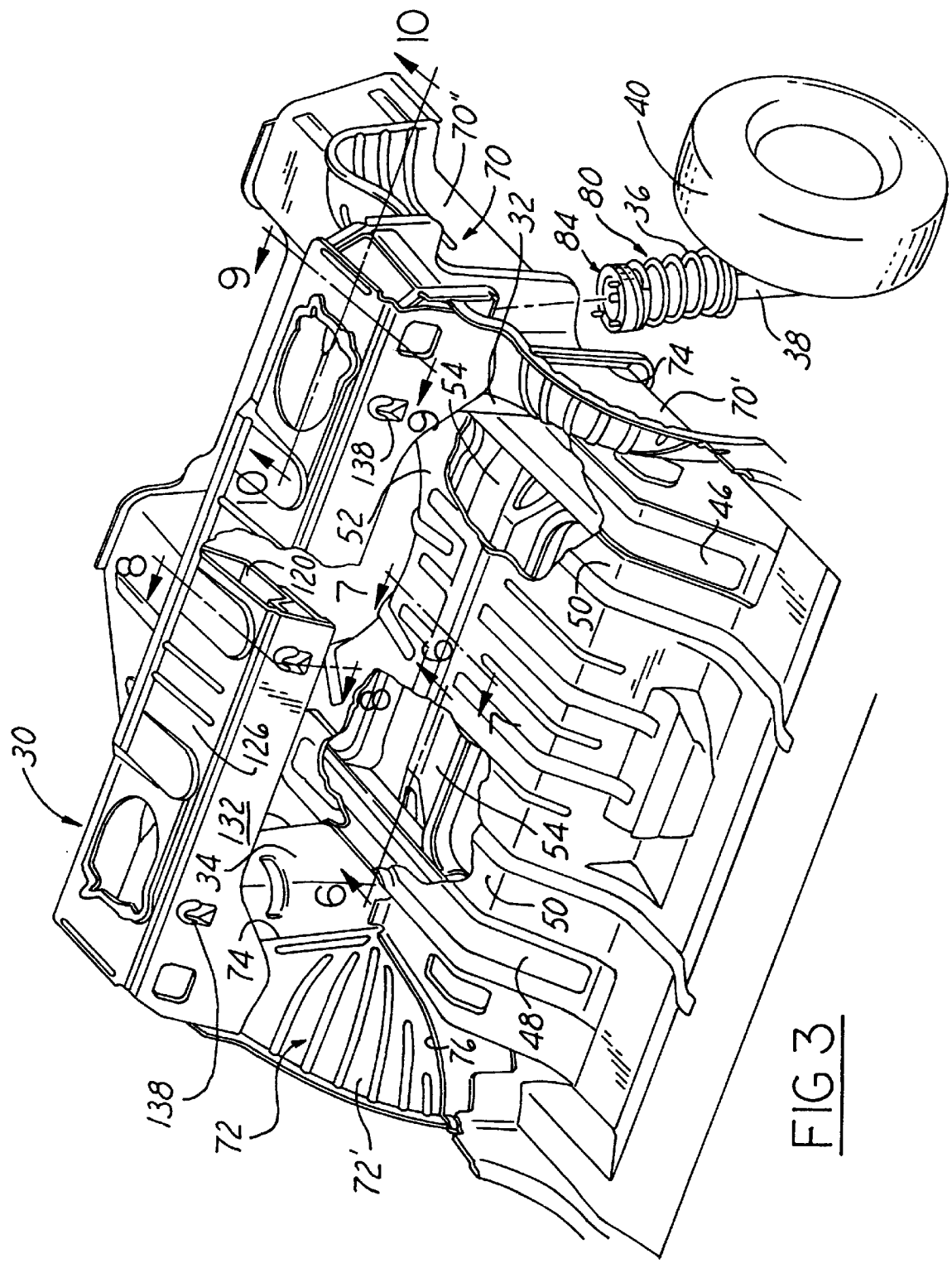
FIG. 3 is a pictorial view of the subject rear framing structure of an automotive vehicle with parts broken away and looking from the passenger compartment.
Figure 4:
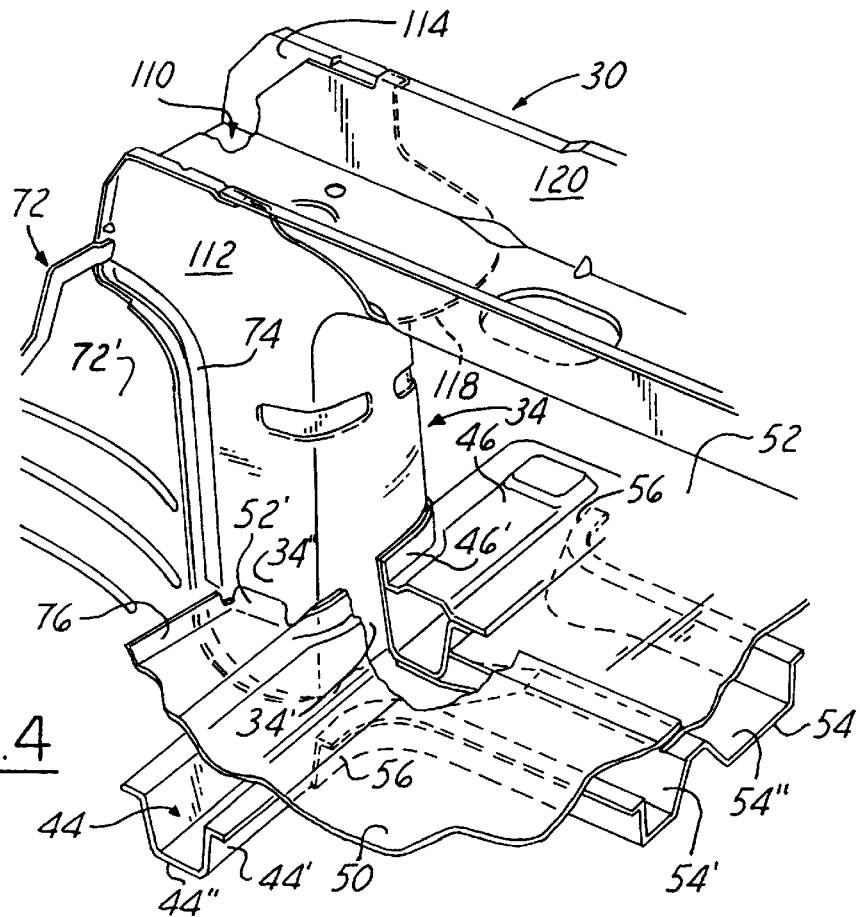
FIG. 4 is an enlarged view of a portion of the rear framing structure shown in FIG. 3 with parts broken away and looking from the passenger compartment.
Figure 5:
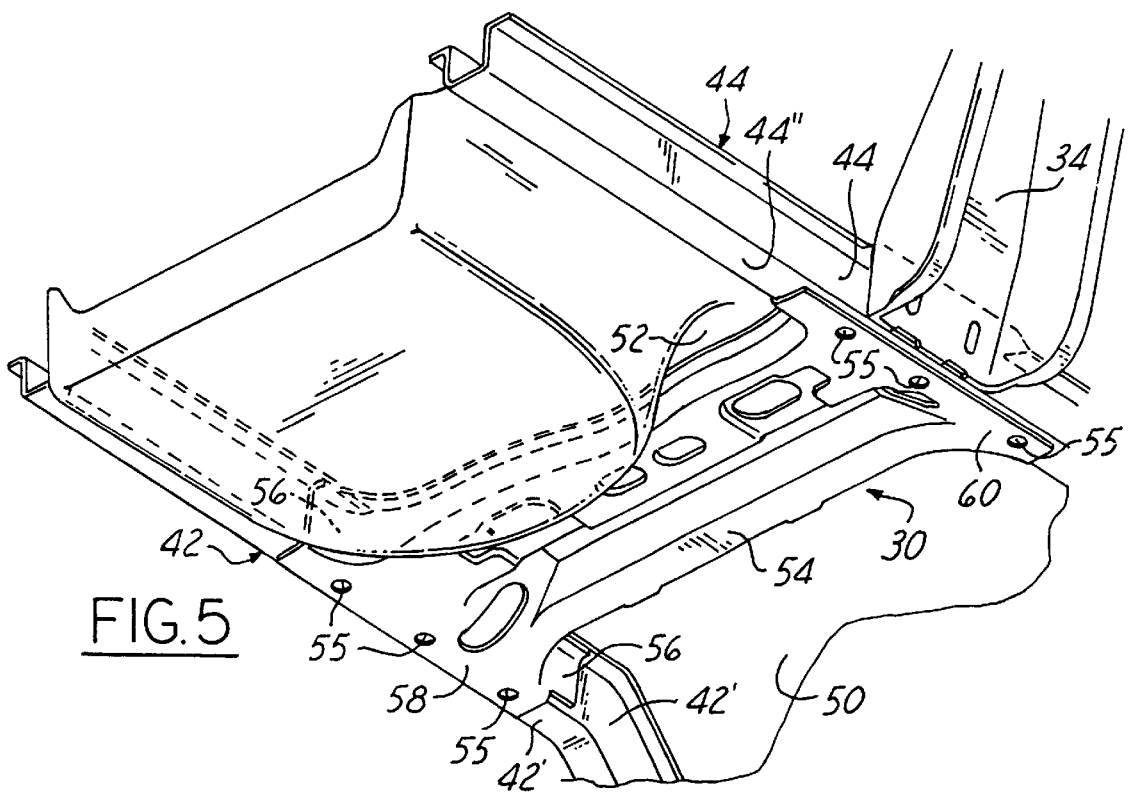
FIG. 5 is a pictorial bottom view of the lower cross beam of the subject rear framing structure of FIG. 2 looking forward from the rear cargo compartment or trunk area.

FIGS. 3, 4 and 5 best show the closed loop type rear framing structure 30 used in the subject vehicle for the purpose of providing a rigid support for the rear suspension components and also for supporting the seat back 12 and related structures shown in FIG. 1. As will be further described, this construction makes possible the provision for an unobstructed pass-through opening from the rear seat area into the trunk. But even more importantly, the subject framing structure provides a higher degree of torsion and beam rigidity and strength as compared to previous vehicle structures. This is significant because the rear framing structure includes and strengthens a pair of laterally spaced left (driver's side) and right (passenger side) suspension strut towers 32 and 34. Each of these strut towers 32, 34 are the primary support for a rear suspension assembly including a spring 36 and a shock absorber 38 which support a vehicle wheel 40 and directly receive road induced vibrations and noise therefrom.

Figure 6:
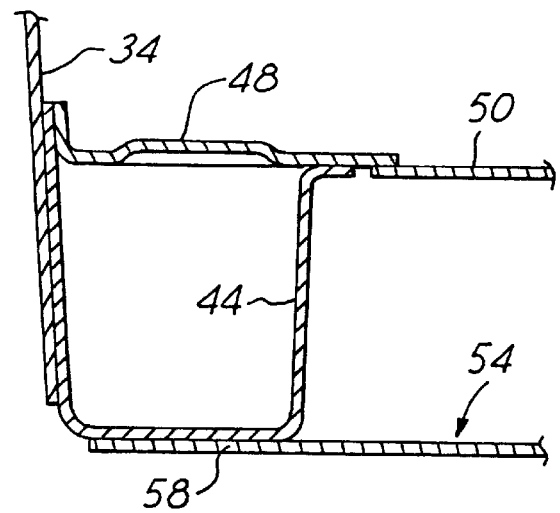
FIG. 6 is a cross sectional view taken along sight lines 6—6 in FIG. 3.

More particularly, the closed loop framing structure 30 of this invention incorporates the previously identified pair of laterally spaced suspension strut towers 32 and 34 and a left and a right side rail member 42, 44 as best seen in FIG. 4 and 5. Each of the strut towers 32, 34 are welded to a side rail 42 and 44 respectively. The side rails 42, 44 extend longitudinally with respect to the vehicle and have a generally U-shape in cross section as best seen in FIGS. 4 and 5. To each of the side rails 42, 44, an elongated sheet metal cap member 46, 48 is secured respectively as shown in FIGS. 3 and 6. Specifically, each cap member 46, 48 covers an open top portion of the associated side rail 42, 44 with edge portions of the covers welded to the upper edge portions of the side rails to form a closed box-like structure as viewed in cross-section in FIG. 6. Cap members 46, 48 are substantially planar with the vehicle passenger compartment floor pan 50 and with the vehicle trunk floor pan 52. Cap members 46, 48 generally follow the path of the upper edges of the associated side rail member in the vehicle's longitudinal direction from a forward area in the passenger compartment to a more rearward area in the trunk compartment. The forward most portion of each rail member 42, 44 forms a support for a forward end of a trailing arm member (not shown) of the suspension. In this regard, reference is made to the previously described U.S. Pat. No. 5,660,415 to Redman et al. The trailing arm member establishes the longitudinal positioning of an associated wheel and its other suspension components.

An elongated rear suspension lateral link carrier assembly (not shown) for supporting rear suspension components for each of the rear wheels is attached to end portions of an elongated cross member or support (not shown) which is adapted to extend along and directly below a rear cross beam member 54 shown in FIG. 5. Each opposite end portions of the elongated suspension carrier assembly is adapted to be fastened by bolts to the side rail member 42, 44 and ends of the rear cross beam member 54. For receiving this bolted connection, apertured mounting points 55 are identified in FIG. 5. Specifically, these mounting points 55 consist of openings through the ends of the cross beam 54 and side rails 42, 44 and brackets with floating tap plates (not shown) within the side rails as per the above identified U.S. application Ser. No. 08/678,285. This construction and connecting arrangement provides a very stiff and strong structure for adjustably attaching the side rails to the suspension carrier assembly.

Figure 7:
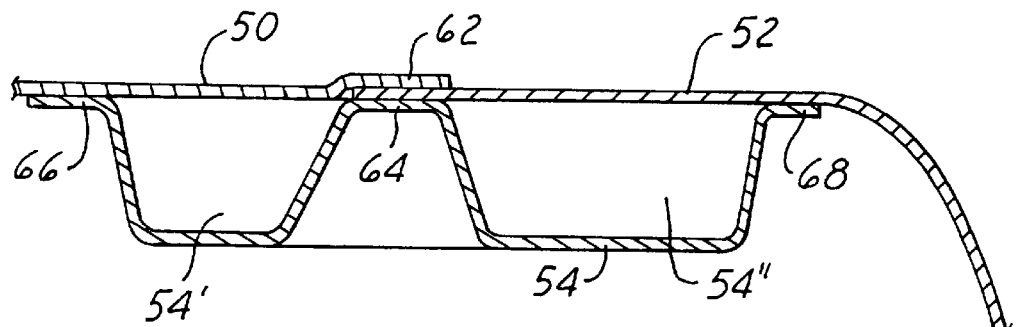
FIG. 7 is a cross sectional view taken along sight lines 7—7 of FIG. 3.

As seen in FIGS. 3 and 5, a lower cross beam member 54 extends laterally across the vehicle between the side rails 42, 44 and the two strut towers 32, 34. This cross beam 54 has a substantially W-shaped configuration as seen in FIG. 7. Specifically, the cross member 54 extends beneath the floor pan 50 and trunk floor 52 and is attached thereto by welds. In FIG. 7, it can be seen that the combination of members 50, 52, and 54 form a closed structure in cross section and define a pair of channels 54' and 54". As best seen in FIG. 4, a side edge portion 56 of the lower cross beam 54 is secured to the side wall 44' of rail member 44 by welds. At the opposite end of the cross beam 54, similar side edge portion are also welded to the other side wall of the rail member 42. In addition, as seen in FIG. 5, the bottom end portions 58, 60 of cross member 54 are extended over the corresponding bottom surfaces 42", 44" of each rail member 42, 44 and welded thereto.

As illustrated in FIG. 4, a lower end portion 34' of the strut tower 34 overlies the side wall 44' of rail member 44 and is welded thereto. Further, the edge 48' of the cap member 48 covers a portion of side wall 44' and is welded thereto for rigidly attaching the lower end portion of the strut tower 34 to the vehicle. At the forward side surface 34" of the strut tower 34 (and at its rearward side surface) an edge portion 50' of the trunk floor member 50 is welded to the strut tower.

In FIG. 7, a cross section of the trunk floor pan 50 and the passenger compartment floor panel 52 are illustrated. The abutting edges of the panels 50, 52 are overlapped in a laterally extending seam joint 62 and are welded together. This overlapping joint 62 is also welded to a centralized divider web 64 of the cross beam 54. These welds are spaced laterally along the joint which extends between the two strut towers 32, 34. The floor pans 50 and 52 are also welded to the upper and outwardly flared flange portions 66 and 68 of the lower cross beam 54, respectively. This forms a rigid enclosed structure providing a pair of enclosed channels 54' and 54". This composite structure greatly increases the strength of the cross beam and also increases its load bearing capacity while reducing the extent of any extended and flat unsupported floor.

Figure 9:
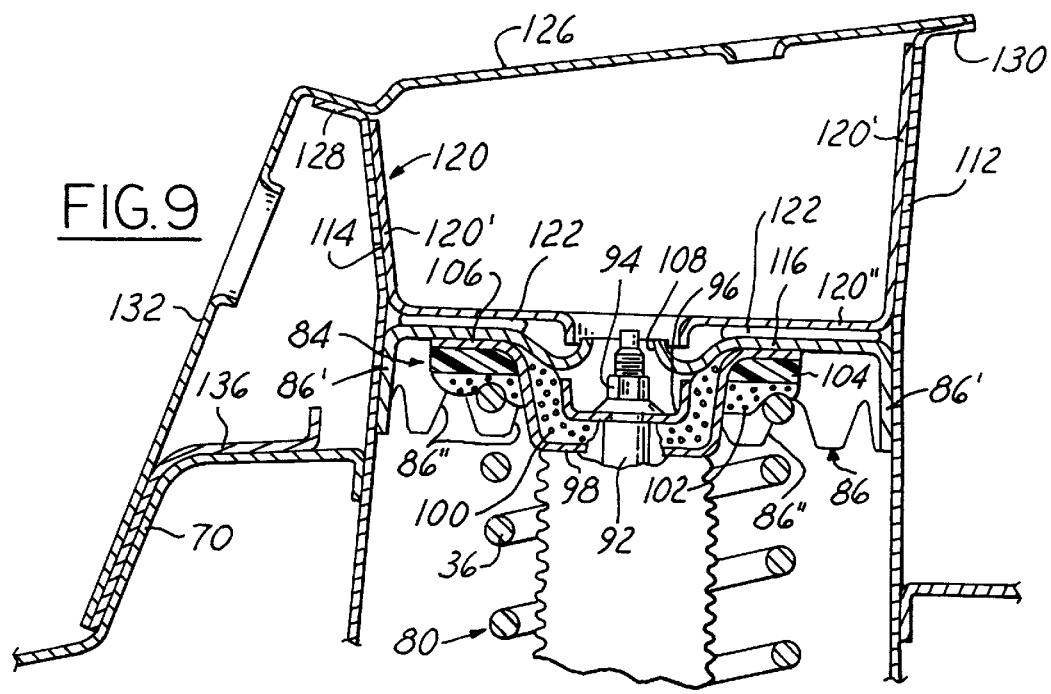
FIG. 9 is a cross sectional view taken along sight lines 9—9 of FIG. 3.
Figure 10:
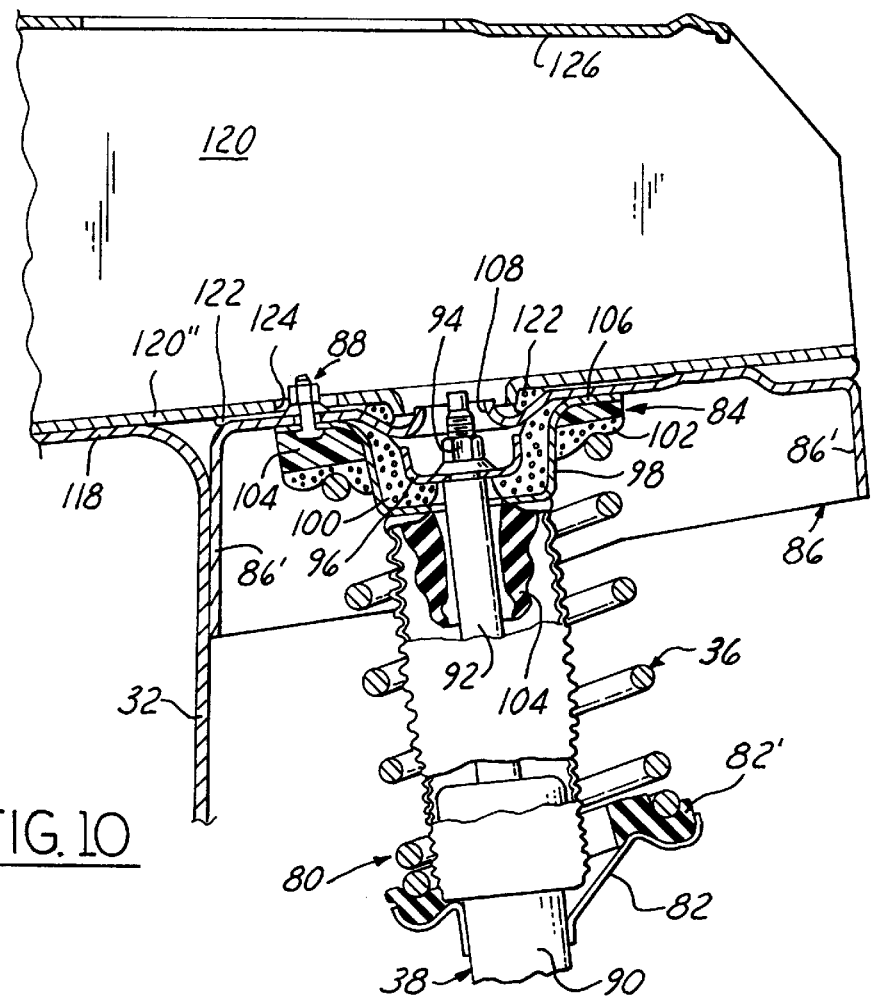
FIG. 10 is a cross sectional view taken along sight lines 10—10 of FIG. 3.

Each of the strut towers 32, 34 are attached by welds to the respective side rail 42 or 44 at a position adjacent to where cross beam member 54 is attached to the side rails. Also, this attachment location is adjacent to where the aforementioned rear suspension lateral location link carrier assembly is attached. The strut towers 32, 34 extend upwardly in a substantially vertical direction from their attachment to the side rails. As best seen in FIGS. 3 and 4, a pair of wheel-house forming assemblies 70 and 72 are attached to respective left and right side strut towers 32, 34 and to the floor panels 50, 52 via weld flange 76. Each of the wheel-house forming assemblies 70 and 72 may actually consist of a forwardly located piece 70', 72' and a rearwardly located piece 70", 72". An edge portions 74 of each of the wheel-house assemblies 70, 72 and an edge portion 50' and 52' of floor panels 50, 52 are welded to a respective strut tower 32, 34. Each wheel-housing assembly 70, 72 and an associated strut tower 32, 34 form a shell-like configuration which is open in the outboard direction of the vehicle to receive vehicle suspension components for each wheel. The primary suspension component is a suspension strut 80 which basically combines a coil suspension spring 36 and a shock absorber 38 as seen in FIGS. 3, 9, and 10.

Typical suspension struts 80 are of the MacPherson type which include a compression acting, coil-type spring 36 which encircles a shock absorber 38. As best shown in FIG. 10, the spring 36 is seated at its lower end by a bracket assembly 82 attached to the outer tube of the shock absorber 38. The bracket assembly 82 also includes an annular shaped cushion member 82' of stiff but relatively flexible elastomeric material. As best shown in FIGS. 9 and 10, the suspension spring 36 extends upwards from lower bracket 82 to an upper seat formed by a mount assembly 84. Details of the mounting arrangement will be described more particularly hereinafter. The upper mount assembly 84 is secured to an inverted, generally cup-shaped cap member 86 by a plurality of stud and nut fasteners 88 (only one shown in FIG. 10). The cap member 86 includes downwardly turned edge portions 86' formed by deep drawing a flat metal plate. The edge portion 86' has several carved-out portions 86" which are formed prior to deep drawing the cap member to prevent buckling of the edge so that a relatively smooth edge can be obtained which overlie the walls of the associated strut tower (32, 34) and is welded thereto in several places.

The shock absorber portion 38 of strut 80 has a piston (not shown) reciprocally mounted within its housing 90 as is conventional for such components. The piston is attached to a rod 92 which extends out from the tubular shock absorber housing 90. An upper end of the rod 92 is connected to mount assembly 84 by a threaded nut fastener 94. More specifically, this upper end portion of the rod is threaded and the nut 94 is threadably attached thereto. A lower face portion of the nut 94 bears against a washer-like member 96 which is a part of the mount assembly 84. The member 96 is spaced from another cup-shaped member or outer mount bracket 98 by cushioning and vibration dampening material 100. Further, the upper end portion of spring 36 engages an annular shaped member 102 formed of stiff but flexible elastomeric material. A back-up member 104 of relatively rigid elastomeric material is molded to the flange portion 106 of the mounting bracket member 98. Finally, a central opening 108 is formed through the cap member 86 to provide access to the nut 94 primarily for service of the strut 80.

Referring to FIG. 4, a yoke-like configuration 110 is formed at the upper portion of each strut tower 32, 34. The yoke 110 is primarily formed between a pair of upwardly extending and spaced side wall portions 112, 114 of the strut tower itself. Referring to FIGS. 9 and 10, it can be seen that the yoke 110 is also defined by a horizontally extending upper wall 116 of the cap member 86 and a horizontally extending and oriented formed portion 118 of the strut towers 32, 34. The yoke defining side walls 112, 114 of each strut tower 32, 34 are spaced so as to closely receive an end portion of an upper cross beam member 120. The upper cross beam member 120 has a generally U-shaped configuration as viewed in cross section and illustrated in FIG. 9. Note that elastic material 122 is located between the upper surface of the cap member 86 and the lower surface of the upper cross beam 120 for dampening any vibrations that the cap member receives from the suspension which is thereby not transmitted to the cross beam. Also, note in FIG. 10 that the fasteners 88 attaching the strut assembly mounting bracket 84 to the cap member 86 do not engage the cross beam 120. An enlarged opening 124 in the bottom wall 120" prevents contact between the fasteners 88 and the cross beam 120 and therefore isolates the cross beam 120 from the strut 80.

For installation and assembly of the vehicle, the lower end portions of the strut towers 32, 34, the side rails 42, 44, the floor pans 50, 52, and the ends of the lower cross beam 54 are accurately positioned and welded to form a solid lower base for the vehicle rear portion. Next, the upper cross beam 120 is positioned relative to the upper portions of the strut towers. Specifically, the end portions of the upper cross beam 120 are placed or "floated" through respective yoke portions 110 located at the upper end of a respective strut tower 32, 34. Each yoke portion is primarily defined between upwardly extending and spaced side walls 112, 114 of the strut tower. The upper cross beam is fixtured to position it correctly with respect to the vehicle frame or platform. Then, the upper ends of the strut towers 32, 34 are aligned correctly both vertically and in parallelism relative to one another. Next, the side walls 112, 114 of the yoke 110 are spot welded to the side walls 120' of the upper cross beam 120 at a plurality of locations. Further, a plurality of welds attach the lower wall portion 120" of cross beam 120 to the inwardly directed portion 118 of the strut tower itself. Especially, the many spot welds between the yoke's side walls 112, 114 and the walls 120' of the upper cross beam 120 are spaced apart an extend laterally across a substantial distance of the overlying walls 112, 114, and 120'. This creates a particularly strong joint therebetween to inhibit any significant movement between the strut tower and the upper cross beam. It should be noted that these very rigid and strong joints or connections between the members 32, 32 and the ends of the cross beam 120 are accomplished without any addition of gusset members or other auxiliary bracing members which would add weight, increase assembly complexity, introduce paths for errors in alignment, and take-up space in the interior framed by the strut towers, floor, and upper cross beam.

The above described assembly process greatly enhances quantity build of the vehicle as even very minor dimensional variations can be corrected before the final fixing of the strut towers. These seemingly minor variations may result in significant strut tower to strut tower misalignments. With this construction the strut towers are very accurately aligned and matched to the ends of the upper cross beam so that force moments associated with the upper beam are also reduced.

Figure 8:
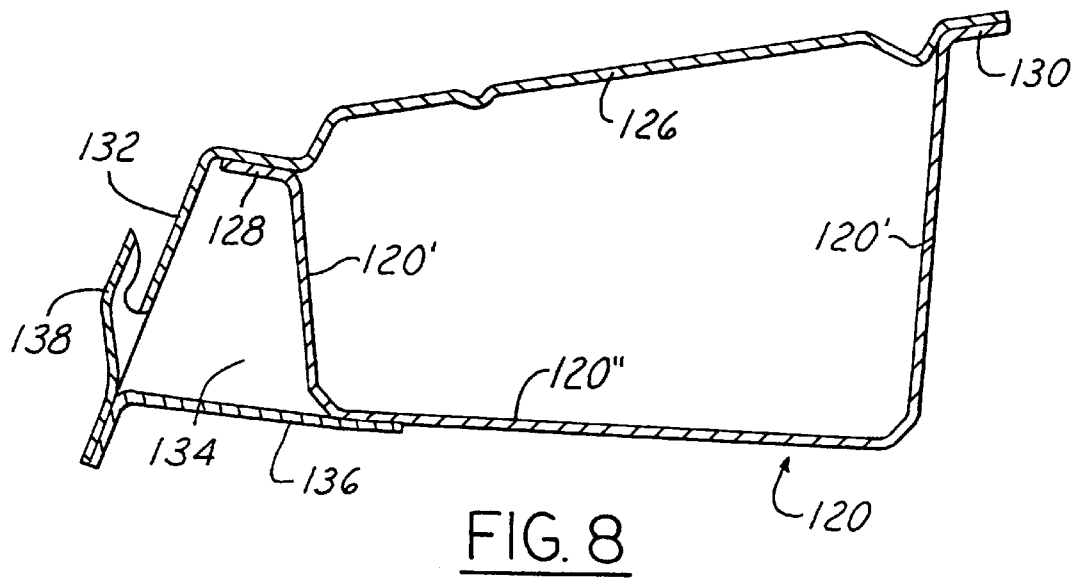
FIG. 8 is a cross sectional view taken along sight lines 8—8 of FIG. 3.

The open top portion of the upper cross beam 120 is closed and therefore strengthened by welding a shelf panel member 126 thereto. Specifically, a pair of outwardly flared flanges 128 and 130 of the upper cross beam 120 are welded to the edges of the shelf panel 126. As shown best in FIGS. 8 and 9, the upper cross beam 120 is further strengthened by its attachment to a forwardly and downwardly extending portion 132 of the top shelf panel 126. Portion 132 in turn is welded to the wheel-housing 70. This provides a laterally extending cell or section 134 which is closed by a lower panel member 136 welded to the lower web of the upper cross beam 120 and to a forward portion of the top shelf panel 126. This closed section 134 augments the strength of the upper cross beam 120 and provides longitudinal support for the upper portion of the rear seat back. Referring to the seat back, the hook-shaped configuration 138 in FIG. 8 is used to support and retain the associated seat back assembly.

When the lower and the upper cross beams 54, 120 are rigidly attached to the lower and the upper portions of the suspension struts towers 32, 34 and floor pans 50 and 52, a generally continuous or closed type loop structure is created for the rear framing structure. Also, the operative relationship between the closed type loop structure and the longitudinally extending side rails provides a very rigid platform for rear suspension components. The assembly has substantially increased torsion and beam stiffness compared to previous framing structures. It resists bending moments caused by input into this structure by the wheels and suspension struts including substantial side loads resulting from vehicle operations on rough, pothole-cratered road surfaces.

More specifically, referring to the upper mounting assembly for rear suspension components, the strut mount assembly 84 and cap member 86 are isolated from the beam structure of the vehicle by a cushion of elastomeric material 122. Specifically, a suitable elastomer material may be injected in the desired space and subsequently cured to serve as a dampening agent for suspension vibrations transmitted to the strut cap. Further, the end of the shock absorber rod 92 is attached to a member 96 which itself is isolated from the strut mounting member 98 by the sufficiently rigid yet resilient elastomeric material 100. Further, a tubular jounce bumper 140 of rubber material is carried by the rod 92 and extends downward toward the upper end portion of the shock housing 90. When the shock absorber is fully compressed such as by the wheel engaging a raised portion of the road, the rubber jounce bumper 140 engages the top of the shock absorber housing and is distorted so as to cushion the shock of such shock absorber action.

From the above, it will be understood this invention provides a rigid rear suspension mounting frame assembly which reaches an improved standard for frame stiffness, strength and quietness while also providing and improving provision for a cargo pass-through from the trunk into the back seat compartment of the passenger compartment.

While a preferred embodiment of the invention has been shown and described, other embodiments will now become apparent to those skilled in the art. Accordingly, this invention is not to be limited to that which is shown and described but by the following claims.

We claim:

1. In combination, a suspension strut for the road wheel of an automotive vehicle having a shock absorbing component with an active end portion and a coil type suspension spring operatively disposed therearound, a vehicle frame comprising an upper laterally-extending beam, a lower longitudinally-extending side rail, an elongated tower for said suspension strut extending in a generally vertical orientation from attachments and with said side rail and cross beam, said strut tower having a pair of laterally spaced side walls defining an upper end portion thereof, a cap member secured within said side walls at a fixed distance from the upper extremity of said strut tower, said cap member having a horizontally extending upper wall that cooperates with said side walls of said strut tower to define an upper yoke for receiving and attaching to an end portion of said upper cross beam, said cross beam having a bottom wall located above the upper wall of said cap member to cooperatively define a horizontally extending damper space therebetween, a mounting assembly for connecting the active end portion of said shock absorbing component to said cap member including inner and outer mounting brackets and vibration dampening material operatively disposed therebetween, and further including a ring of resilient material for seating the upper end of said suspension spring, and a layer of elastomer operatively disposed in said damper space between said cap member and said upper cross beam for damping vibrations imparted to said cap member from said suspension spring and said shock absorbing component and effectively isolating said cross beam from said cap member to inhibit transmittal of vibratory energy to said cross beam.

2. The combination of claim 1 and wherein said elastomer is injected into the damper space so that said space is substantially filled to an operative volume whereby interfacing areas of said bottom wall of said cross beam and the upper wall of said cap member are operatively contacted by the elastomer to optimize dampening of suspension vibrations.

3. A rear framing structure for a vehicle comprising: a pair of rear suspension strut towers laterally spaced apart across the vehicle, each strut tower extending in a general vertical orientation adapted to house and support an associated rear wheel suspension strut member, each said suspension strut member including a shock absorber with an active upper end portion which receives vibrations from the associated rear wheel of the vehicle; an upper cross beam extending laterally across the vehicle having opposite end portions for respective connection to upper portions of said pair of strut towers, a pair of lower longitudinally-extending side rails laterally spaced from one another and respectively connected to said strut towers associated therewith, said beam end portions defining bottom wall portions extending in a substantially horizontal plane; a cap member attached to the upper portion of each of said strut towers, each cap member defining a generally horizontally extending wall portion; said bottom wall portion of said beam and each said wall portion of said cap members having interfacing areas that are spaced from one another to define uppermost and horizontally extending damper spaces therebetween; elastomeric material operatively disposed in said damper spaces for effectively dampening shock absorbing vibrations and inhibiting noise transmittal between said cap member and said upper beam member; a mounting bracket associated with each cap member for supporting said upper end portion of the shock absorbing component, said mounting bracket having a peripheral flange portion attached to said horizontal wall portion of said cap member and having a downwardly dished central portion thereby defining a cavity; said wall portion of each said cap members having a centralized opening therethrough for loosely receiving said upper end portion of each said suspension component therethrough; a radially expansive attachment member being spaced inwardly from said wall portion of said cap member; resilient material located in a cavity defined by said wall portion of said cap member and said expansive attachment member and further by said outer mounting bracket and being operatively bonded thereto for attaching said upper end of said shock absorbing component to said vehicle frame structure in a cushioning and vibration dampening manner which inhibits transmission of vibration and noise from said shock absorbing component to the vehicle.

* * * * *